United States Patent
Kuromizu

(10) Patent No.: US 9,063,259 B2
(45) Date of Patent: Jun. 23, 2015

(54) ILLUMINATING DEVICE, LIQUID CRYSTAL DISPLAY DEVICE AND TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 273 days.

(21) Appl. No.: 13/814,741

(22) PCT Filed: May 18, 2011

(86) PCT No.: PCT/JP2011/061378
§ 371 (c)(1),
(2), (4) Date: Feb. 7, 2013

(87) PCT Pub. No.: WO2012/020589
PCT Pub. Date: Feb. 16, 2012

(65) Prior Publication Data
US 2013/0135561 A1    May 30, 2013

(30) Foreign Application Priority Data

Aug. 9, 2010    (JP) ................................. 2010-178574

(51) Int. Cl.
| | | |
|---|---|---|
| G02F 1/1335 | (2006.01) | |
| F21V 8/00 | (2006.01) | |
| H04N 5/57 | (2006.01) | |
| H04N 5/66 | (2006.01) | |

(52) U.S. Cl.
CPC ............ *G02B 6/0033* (2013.01); *G02F 1/1336* (2013.01); *H04N 5/57* (2013.01); *H04N 5/66* (2013.01); *G02F 1/133615* (2013.01); *G02B 6/0068* (2013.01); *G02B 6/0091* (2013.01)

(58) Field of Classification Search
CPC .. G02B 6/0033; G02B 6/0068; G02B 6/0091; G02F 1/133615; G02F 1/1336; H04N 5/66; H04N 5/57
USPC .................. 349/65, 68; 362/612, 621, 249.02
See application file for complete search history.

(56) References Cited

U.S. PATENT DOCUMENTS

| | | | |
|---|---|---|---|
| 2009/0015748 A1 | 1/2009 | Kujiraoka et al. | |
| 2012/0293729 A1* | 11/2012 | Yoshikawa | 348/739 |
| 2012/0300135 A1* | 11/2012 | Cho | 348/739 |

FOREIGN PATENT DOCUMENTS

| | | |
|---|---|---|
| JP | 2006-310221 A | 11/2006 |
| JP | 2009-037212 A | 2/2009 |
| JP | 2010-114028 A | 5/2010 |

OTHER PUBLICATIONS

Official Communication issued in International Patent Application No. PCT/JP2011/061378, mailed on Aug. 16, 2011.

*Primary Examiner* — Dung Nguyen
*Assistant Examiner* — Tai Duong
(74) *Attorney, Agent, or Firm* — Keating & Bennett, LLP

(57) ABSTRACT

Provided is an illuminating device capable of preventing luminance unevenness from developing therein. An illuminating device (1) includes a plurality of light-emitting boards (5), each of which includes a long wiring board (52), a plurality of light-emitting elements (51) mounted on the wiring board and clearances (53) between the adjacent light-emitting boards, and a light guide plate having a rectangular shape and arranged to guide light that enters from its end faces (71) inward and emit the light from its front face (73), wherein the plurality of light-emitting boards are aligned along each of the end faces of the light guide plate, the end faces being opposed to each other, while the clearances between the adjacent light-emitting boards on the opposed end faces do not face each other while sandwiching the light guide plate therebetween.

14 Claims, 8 Drawing Sheets

ILLUMINATING DEVICE, LIQUID CRYSTAL DISPLAY DEVICE AND TELEVISION RECEIVING DEVICE

TECHNICAL FIELD

The present invention relates to an illuminating device, a liquid crystal display device including the illuminating device, and a television receiving device including the illuminating device.

BACKGROUND ART

A transmissive or transflective liquid crystal display device includes a liquid crystal display panel and an illuminating device (a so-called backlight) disposed behind the liquid crystal display panel. In this type of liquid crystal display device, planar light emitted from the illuminating device is used to display an image on a display screen of the liquid crystal display panel.

An edge (side) light type illuminating device is known as the illuminating device, which has a configuration that light-emitting boards such as LED (Light Emitting Diode) boards, which include long wiring boards on which a plurality of LEDs (Light Emitting Diodes) are aligned, are disposed along end faces of a light guide plate that defines a clear plate made from an acrylate resin. In this type of illuminating device, the light emitted from the light-emitting boards is guided to enter the light guide plate from the end faces of the light guide plate, and thereby the entering light is made into planar light and emitted from a front face of the light guide plate. The light guide plate includes scattering members in a dot pattern that are disposed over a back face or a front face of the light guide plate and arranged to scatter the light that enters from the end faces of the light guide plate. In addition, a reflection sheet arranged to reflect the light is provided on the back face of the light guide plate. Thus, the light emitted from the light-emitting boards as described above is scattered or reflected by the scattering members or the reflection sheet, and is thus made into planar light and emitted from the front face of the light guide plate.

The positions at which the light-emitting boards are disposed in this illuminating device are determined considering brightness required of the illuminating device, brightness required of the light-emitting boards, and size required of the light guide plate (the liquid crystal display panel). For example, when a light guide plate is relatively small in size, LED boards disposed along one end face of a light guide plate can provide enough brightness as is disclosed in the illuminating device of PTL 1 (JP 2006-310221). Meanwhile, when a light guide plate is relatively large in size, a plurality of light-emitting boards are disposed along a plurality of end faces of a light guide plate in order to provide enough brightness in a convincing way.

In an illuminating device used in a large liquid crystal display device, a plurality of LED boards are sometimes aligned on one end face of a light guide plate. For example, when the plurality of LED boards are connected in series as one LED board, a voltage placed on the LED board becomes too large. For this reason, the plurality of LED boards that are separated from each other are aligned horizontally on one end face of the light guide plate as described above.

FIG. 7 is a plan view showing a schematic configuration of a conventional illuminating device 1P. The illuminating device 1P mainly includes a backlight chassis 4P having a box shape, a light guide plate 7P having a rectangular shaped and housed in the backlight chassis 4P, and a plurality of (four) LED boards 5P including long wiring boards 52P on which a plurality of LEDs 51P are mounted. The LED boards 5P are of the same kind, and are same in length (the lengths of the long wiring boards 52P are same). Two LED boards 5P are aligned along an end face 71P on one long side of the light guide plate 7P, and two LED boards 5P are aligned along an end face 71P on the other long side as shown in FIG. 7. The LED boards 5P along the end faces 71P face each other sandwiching the light guide plate 7P therebetween. Clearances 53P are each formed between the adjacent LED boards 5P along the end faces 71P. The clearances 53P are disposed so as to face each other.

PTL 2 (JP 2009-37212) discloses a technique relating to the present invention.

CITATION LIST

Patent Literature

PTL 1: JP 2006-310221
PTL 2: JP 2009-37212

SUMMARY OF INVENTION

Technical problem

FIG. 8 is a plan view schematically showing luminance unevenness developing in the conventional illuminating device 1P shown in FIG. 7. When the LEDs 51P on the LED boards 5P are turned on to emit light in the illuminating device 1P, the following problem arises: a portion of the light guide plate 7P sandwiched between the facing clearances 53P forms a region x that is darker than the area around it as shown in FIG. 8. The region x is formed so as to cross the light guide plate 7P. The region x is darkest at a center portion of the light guide plate 7P, and has a shape such that the area (the width) broadens out most at the center portion. Thus, if the region x is formed in the light guide plate 7P, unevenness develops in the planer light emitted from the conventional illuminating device 1P (luminance unevenness develops).

The clearances 53P define portions where neither a light-emitting element 51P such as an LED nor a member arranged to reflect light exists. That is, the clearances 53 are not capable of actively projecting (providing) light onto the end faces 71P of the light guide plate 7P. If the portions (clearances) 53P even partly face each other while sandwiching the light guide plate 7P, the amount of light that enters the portion of the light guide plate 7P is remarkably reduced, which could emphasize the luminance unevenness.

An object of the present invention is to provide an illuminating device, which has a configuration such that a plurality of light emitting boards such as LED boards are disposed so as to face light entrance faces of a light guide plate that is disposed on a bottom face of a chassis in a relatively large display device, and is capable of preventing luminance unevenness from developing in regions between the light emitting boards. Another object of the present invention is to provide a liquid crystal display device including the illuminating device. Another object of the present invention is to provide a television receiving device including the illuminating device.

Solution to Problem

To achieve the objects and in accordance with the purpose of the present invention, an illuminating device of the present invention includes a plurality of light-emitting boards, each of which includes a long wiring board, a plurality of light-emitting elements mounted on the wiring board and clearances between the adjacent light-emitting boards, and a light guide plate having a rectangular shape and arranged to guide light that enters from its end faces inward and emit the light from its front face, wherein the plurality of light-emitting boards are aligned along each of the end faces of the light guide plate, the end faces being opposed to each other, while the clearances between the adjacent light-emitting boards on the opposed end faces are prevented from facing each other while sandwiching the light guide plate therebetween.

In another aspect of the present invention, an illuminating device includes a plurality of light-emitting boards that are disposed while facing a light entrance face of one lateral end face of a light guide plate that has a rectangular shape and is disposed on an inner bottom face of a chassis, and a plurality of light-emitting boards that are disposed while facing a light entrance face of another lateral end face of the light guide plate that is opposed to the one lateral end face, wherein the light-emitting boards that face the opposed lateral end faces are disposed while a clearance region between the light-emitting boards facing the light entrance face of the one lateral end face and a clearance region between the light-emitting boards facing the light entrance face of the another lateral end face are prevented from facing each other.

In this case, the clearance regions between the light-emitting boards are prevented from facing each other by a configuration that the light-emitting boards along the one lateral end face of the light guide plate have a length that is different from a length of the light-emitting boards along the another lateral end face.

In addition, the clearance regions between the light-emitting boards are prevented from facing each other by a configuration that the light-emitting boards along the one lateral end face of the light guide plate are different in number from the light-emitting boards along the another lateral end face, the light-emitting boards along the one lateral end face and the light-emitting boards along the another lateral end face facing each other while sandwiching the light guide plate therebetween.

In addition, the luminance of the clearance regions between the light-emitting boards can be adjusted by a configuration that the light-emitting boards along the one lateral end face of the light guide plate are different in emission intensity from the light-emitting boards along the another lateral end face, the light-emitting boards along the one lateral end face and the light-emitting boards along the another lateral end face facing each other while sandwiching the light guide plate therebetween.

If surfaces of the light-emitting boards are subjected to a reflective treatment, the luminance is easily adjusted.

It is preferable that the light-emitting elements define light emitting diodes.

It is preferable that intervals at which the light emitting diodes are aligned on each of the light-emitting boards along the one lateral end face of the light guide plate are different from intervals at which the light emitting diodes are aligned on each of the light-emitting boards along the another lateral end face.

It is preferable that the light emitting diodes mounted on each of the light-emitting boards along the one lateral end face of the light guide plate are different in number from the light emitting diodes mounted on each of the light-emitting boards along the another lateral end face.

It is preferable that the light emitting diodes mounted on the light-emitting boards along the one lateral end face of the light guide plate have an emission peak wavelength different from an emission peak wavelength of the light emitting diodes mounted on the light-emitting boards along the another lateral end face.

It is preferable that the light emitting diodes mounted on the light-emitting boards along the one lateral end face of the light guide plate have a structure different from a structure of the light emitting diodes mounted on the light-emitting boards along the another lateral end face.

It is preferable that the light emitting diodes mounted on the light-emitting boards along the one lateral end face of the light guide plate have directional optical properties different from directional optical properties of the light emitting diodes mounted on the light-emitting boards along the another lateral end face.

It is preferable that at least one of the light emitting diodes includes a blue light-emitting chip that is coated with a fluorescent material that has an emission peak wavelength in a yellow region, and the at least one of the light emitting diodes is arranged to emit white light.

It is preferable that a sealing section for sealing the fluorescent material of each of the light emitting diodes has a dome structure.

It is preferable that a sealing section for sealing the fluorescent material of each of the light emitting diodes has a crater structure.

It is preferable that a mounted chip of each of the light emitting diodes has a flip-chip structure.

It is preferable that a mounted chip of each of the light emitting diodes has a wire bonding structure.

It is preferable that the light-emitting boards further include power supply connectors mounted thereon, and wherein positions at which the power supply connectors mounted on the light-emitting boards along the one lateral end face of the light guide plate are disposed are different from positions at which the power supply connectors mounted on the light-emitting boards along the another lateral end face are disposed.

In another aspect of the present invention, a liquid crystal display device includes the illuminating device described above, and a transmissive or transflective liquid crystal display panel, wherein the illuminating device is disposed on a back-face side of the liquid crystal display panel, and planar light emitted from the illuminating device is projected onto the back-face side of the liquid crystal display panel.

Yet, in another aspect of the present invention, a television receiving device includes the liquid crystal display device described above.

Advantageous Effects of Invention

Having the configuration of including the plurality of light-emitting boards that are disposed while facing the one lateral end face (light entrance face) of the rectangular-shaped light guide plate disposed on the inner bottom face of the chassis, and the plurality of light-emitting boards that are disposed while facing the another lateral end face (light entrance face) of the light guide plate that is opposed to the one end face of the light guide plate, wherein the light-emitting boards that face the opposed lateral end faces are disposed while the clearance region between the light-emitting boards facing the one lateral end face and the clearance region between the light-emitting boards facing the another lateral end face do not face each other, the illuminating device of the present invention is capable of preventing luminance unevenness from developing therein. Another object of the present invention is to provide a liquid crystal display device including the illuminating device. In addition, the liquid crystal display device including the illuminating device, and the television receiving device including illuminating device are capable of preventing luminance unevenness from developing therein.

DESCRIPTION OF EMBODIMENTS

Figure 1:
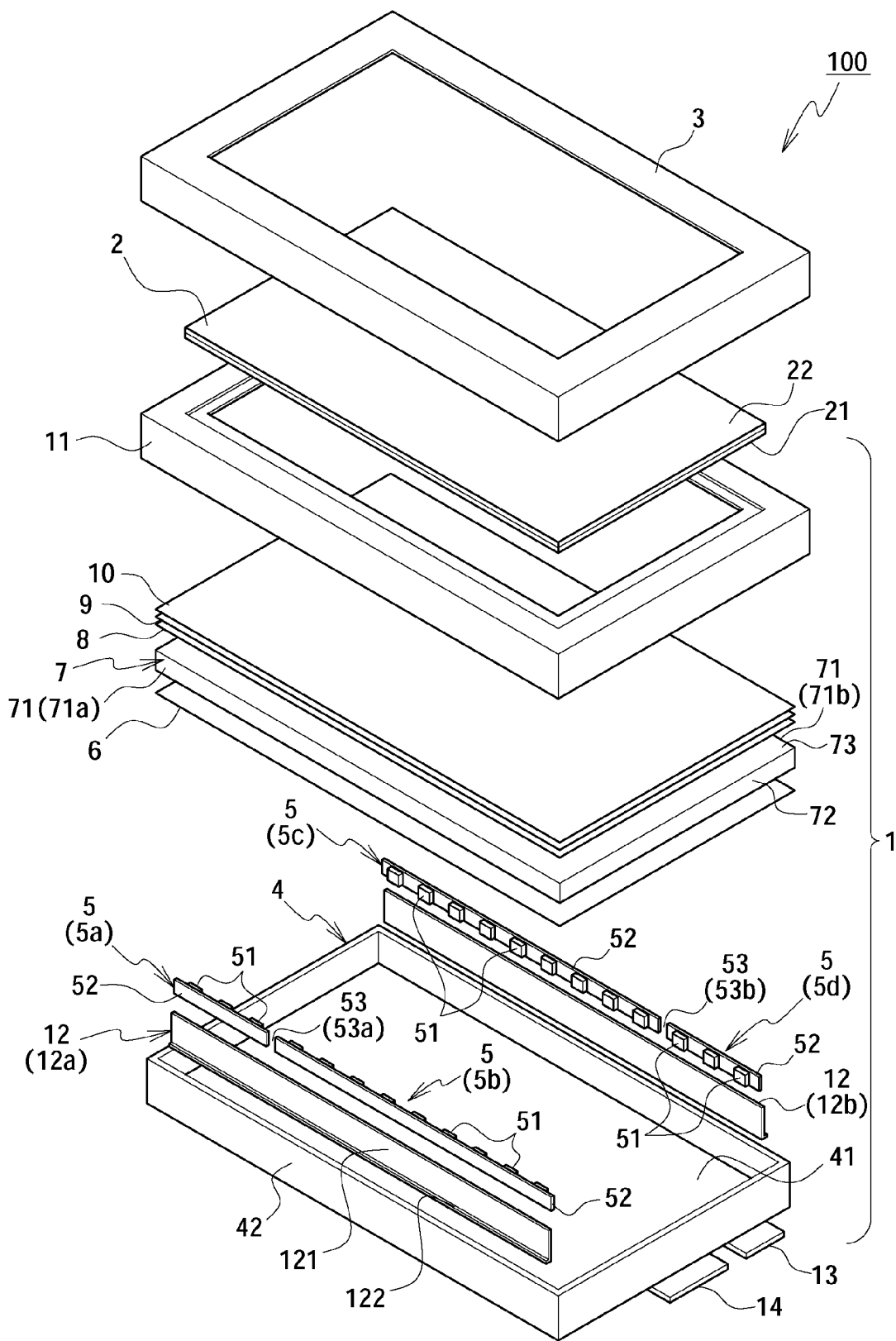
FIG. 1 is an exploded perspective view showing a schematic configuration of a liquid crystal display device of a preferred embodiment of the present invention.

Detailed descriptions of an illuminating device and a liquid crystal display device of preferred embodiments of the present invention will now be provided with reference to the accompanying drawings. The present invention shall not be construed as limited to the preferred embodiments described in the present specification. Components that have the same functions are explained once, providing the same reference numerals to the components in the drawings and the present specification.

[Liquid Crystal Display Device]

FIG. 1 is an exploded perspective view showing a schematic configuration of a liquid crystal display device 100 of a preferred embodiment of the present invention. The liquid crystal display device 100 includes an illuminating device 1. The illuminating device 1 is a so-called edge light type illuminating device. The liquid crystal display device 100 includes the illuminating device 1, a liquid crystal display panel 2, and a bezel 3, which are disposed in this order from the bottom as shown in FIG. 1.

[Illuminating Device]

The illuminating device 1 includes a backlight chassis 4, LED boards (light-emitting boards) 5, a reflection sheet 6, a light guide plate 7, optical sheets 8 to 10, and a frame 11, which are disposed in this order from the bottom as shown in FIG. 1.

The backlight chassis 4 preferably defines a box of low height prepared by bending a metal plate made from aluminum. The backlight chassis 4 includes a bottom 41 having a rectangular shape, and walls 42 that erect on the bottom 41 so as to surround the bottom 41 as shown in FIG. 1. The backlight chassis 4 houses the LED boards 5, the reflection sheet 6, the light guide plate 7, and the optical sheets 8 to 10.

The LED boards 5 include wiring boards 52, on each of which a plurality of LEDs 51 are mounted. The wiring boards 52 have a long shape (a long strip-like rectangular shape), and are preferably made of printed boards. The light-emitting elements 51 are electrically connected in series to each other by wiring patterns of each wiring board 52. LED chips themselves, or LED packages that include LED chips are preferably used as the light-emitting elements 51. Each LED package has a configuration such that an LED chip is encapsulated in a transparent resin, and electrodes for sending electricity to the LED chip are mounted on a surface of the resin. Known LED packages arranged to emit white light are used as the present LED packages.

The LEDs 51 are mounted on each ELD board 5 and aligned while spaced apart from each other (e.g., at regular intervals). The brightness (luminance) of the LEDs 51 is adjusted to be equal to one another. The LED boards 5 are electrically connected to a power board 13 disposed behind the backlight chassis 4. Power is supplied from the power board 13 to the LED boards 5.

It is preferable that each LED board 5 is subjected to a surface treatment to increase the reflectivity of light (a reflective treatment) by coating a surface where the LEDs are not mounted (i.e., a surface of each wiring board 52) with reflective paint (e.g., white paint).

In the present embodiment, four LED boards 5 are used. The LED board 5a and the LED board 5b are aligned and fixed to a fixing plate 12 (12a). The LED board 5c and the LED board 5d are aligned and fixed to a fixing plate 12 (12b).

The fixing plates 12 (12a and 12b) are fixed to the bottom 41 close to the walls 42 on the long sides of the backlight chassis 4. Each fixing plate 12 includes a portion erecting from the bottom 41 (an erecting portion 121), and a portion that bends at the foot of the erecting portion 121 to be in close contact with the bottom 41 (a contact portion 122). Each fixing plate 12 has the shape of the letter "L" in cross section. The LED boards 5 are fixed to the erecting portions 121 of the fixing plates 12 so as to erect. The LED board 5a and the LED board 5b, and the LED board 5c and the LED board 5d are disposed so as to face each other in the backlight chassis 4.

In the present embodiment, the LED boards 5a and 5d are of the same kind, and thus their wiring boards 52 are same in length and their LEDs 51 are same in number. The LED boards 5b and 5c are of the same kind, and thus their wiring boards 52 are same in length and their LEDs 51 are same in number. In the present embodiment, the LED board 5a (5d) is shorter than the LED board 5b (5c).

A clearance 53 (53a) is formed between the LED boards 5a and 5b that are aligned in the backlight chassis 4. In addition, a clearance 53 (53b) is formed between the LED boards 5c and 5d that are aligned in the backlight chassis 4.

The reflection sheet 6 has a rectangular shape, and is laid on the bottom 41 of the backlight chassis 4. The reflection sheet 6 defines a white expanded resin sheet (e.g., an expanded polyethylene terephthalate sheet). The light guide plate 7 is disposed on the reflection sheet 6.

The light guide plate 7 has a rectangular shape as a whole when seen in a plan view. The light guide plate 7 defines a plate member made from a clear material such as an acrylic resin, which is about 3 to 4 mm in thickness. In the present embodiment, light emitted from the LED boards 5 enters from two end faces 71 (71a and 71b) on the long sides of the light guide plate 7.

The light guide plate 7 includes a plurality of scattering members in a dot pattern (not illustrated) that are disposed on a back face 72 of the light guide plate 7. The scattering members are preferably provided thereon by dotting paint containing a white pigment on the back face 72 of the light guide plate 7 in a silkscreening printing method, or are preferably provided thereon by forming concave portions (i.e., frosting) on the back face 72 of the light guide plate 7, which are formed by shaving the back face 72. The light guide plate 7 is locked by locking pins (not illustrated) erecting from the bottom 41, and is thus positioned with respect to the backlight chassis 4.

The optical sheets 8 to 10 are disposed on a front face 73 of the light guide plate 7 as shown in FIG. 1. The optical sheets 8 to 10 define resin sheets, each of which has a rectangular shape, and is about 0.1 to 0.5 mm in thickness. The optical sheets 8 to 10 are stacked on the front face 73 of the light guide plate 7.

The optical sheet 8 defines a so-called diffusion sheet, and is arranged to diffuse the light emitted from the front face 73 of the light guide plate 7 to allow uniformalization of luminance distribution of the light. The optical sheet 9 defines a so-called lens sheet, and is arranged to gather the light emitted from the diffusion sheet (optical sheet 8) to allow enhancement of front brightness of the light. The optical sheet 10 defines a so-called polarization selective reflection sheet, and is arranged to selectively reflect the light emitted from the lens sheet (optical sheet 9) so that the light is not absorbed by a polarizing plate (not illustrated) that is attached on the lower side of the liquid crystal display panel 2.

The frame 11 has a frame shape. The frame 11 is arranged to cover the backlight chassis 4 that houses the stack of the optical sheets 8 to 10, the light guide plate 7 and the reflection sheet 6. The frame 11 is fixed to the walls 42 so as to cover front end faces of the walls 42 of the backlight chassis 4. The frame 11 is prepared, for example, by processing a known member made from a metallic or a plastic material so as to have a predetermined shape. The liquid crystal display panel 2 is disposed on the frame 11.

The liquid crystal display panel 2 is disposed on a front-face (upper-face) side of the illuminating device 1. The liquid crystal display panel 2 consists of two glass substrates that are bonded together while sandwiching a liquid crystal material therebetween. One of the glass substrates defines a TFT (Thin Film Transistor) substrate and the other defines a CF (Color Filter) substrate. The liquid crystal display panel 2 is arranged to receive light that is projected onto its back face 21 from the illuminating device 1, and display an image on its front face 22 using the light. The liquid crystal display panel 2 is electrically connected to and driven by a control circuit board 14 that is disposed behind the illuminating device 1.

The bezel 3 has a frame shape and is arranged to cover the periphery of the liquid crystal display panel 2. The bezel 3 and the frame 11 sandwich the liquid crystal display panel 2 therebetween. Thus, the bezel 3 is fixed to the backlight chassis 4, and is, together with the backlight chassis 4, arranged to ensure strength of the entire liquid crystal display device 100. The bezel 3 is prepared, for example, by processing a known material such as a metallic or a plastic material so as to have a predetermined shape.

Figure 2:
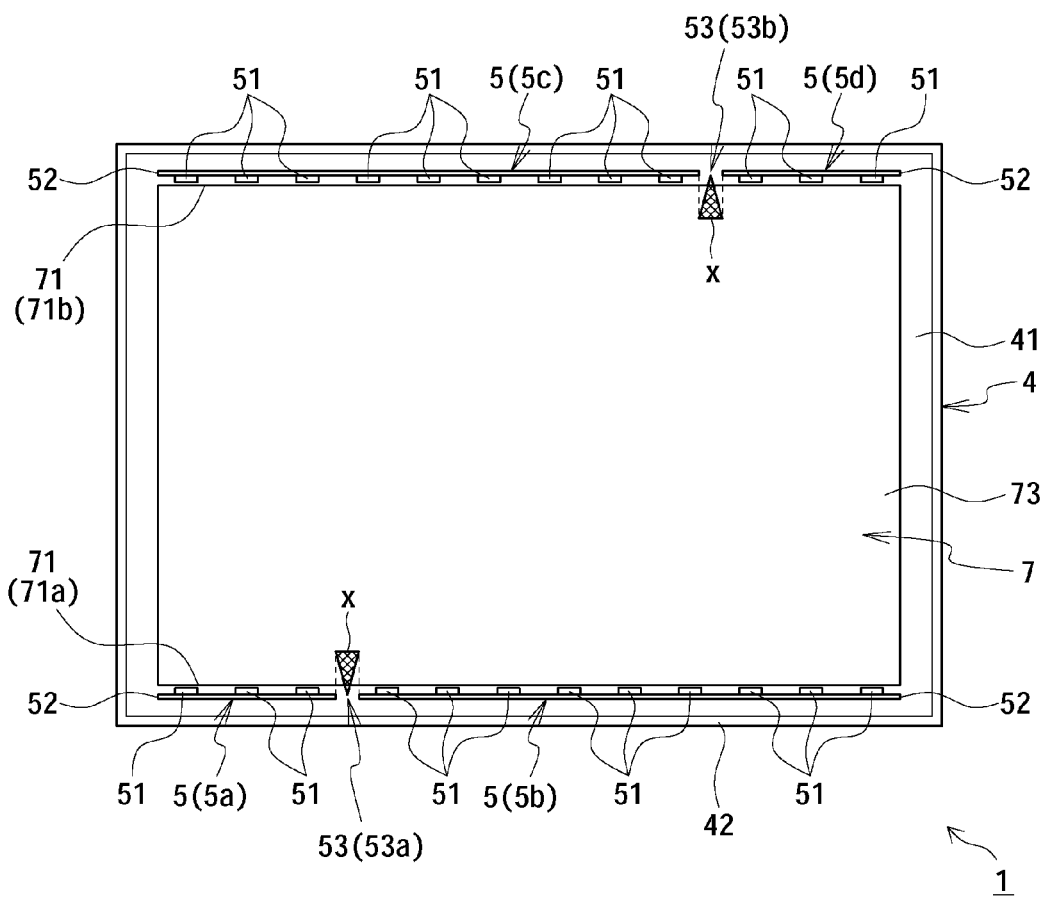
FIG. 2 is a plan view showing a schematic configuration of an illuminating device shown in FIG. 1.

FIG. 2 is a plan view showing a schematic configuration of the illuminating device 1 shown in FIG. 1. A description of the disposition of the LED boards 5 in the illuminating device 1 of the present embodiment will be provided with reference to FIG. 2. In the illuminating device 1 shown in FIG. 2, the frame 11 and the optical sheets 8 to 10 are deleted for the sake of illustration.

The LED boards 5a and 5b are aligned along the end face 71a on one long side of the light guide plate 7 as shown in FIG. 2. The clearance 53 (53a) exists between the LED boards 5a and 5b. Meanwhile, the LED boards 5c and 5d are aligned along the end face 71b on the other long side of the light guide plate 7 as shown in FIG. 2. The clearance 53 (53b) exists between the LED boards 5c and 5d. The LEDs 51 on the LED boards 5 are disposed so as to face the end faces 71.

In the present embodiment, the long sides of the light guide plate 7 are longer than the total of the length of the LED board 5a and the length of the LED board 5b, so that the clearance 53 (53a) is formed between the LED boards 5a and 5b. In addition, for the same reason, the clearance 53 (53b) is formed between the LED boards 5c and 5d. In the present embodiment, the shorter LED board 5a (or 5d) is disposed on the left as it faces the end face 71 of the light guide plate 7 while the longer LED board 5b (or 5c) is disposed on the right as it faces the end face 71 of the light guide plate 7 as shown in FIG. 2. Disposing the LED boards 5 as described above makes the LED boards 5 different in length face each other while sandwiching the shorter sides of the light guide plate 7 therebetween. Consequently, the clearances 53 (53a and 53b) formed between the LED boards 5 do not face each other while sandwiching the light guide plate 7 therebetween.

Owing to the disposition of the LED boards 5 where the clearances 53 do not face each other, when the LEDs 51 on the LED boards 5 are turned on to emit light, the LED boards 5 disposed in front of the clearances 53 can easily provide the light to portions of the light guide plate 7 that are close to the clearances 53. Consequently, uniform planar light can be easily emitted from the front face 73 of the light guide plate 7, which can prevent luminance unevenness from developing in the illuminating device 1.

Figure 3:
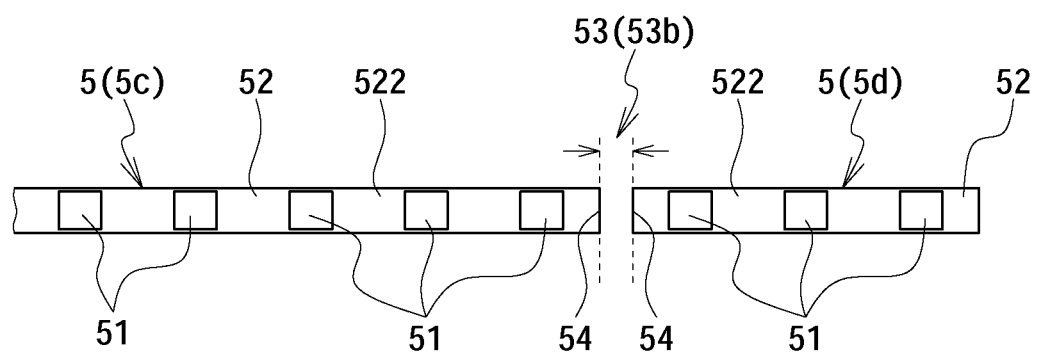
FIG. 3 is an explanatory view showing a clearance formed between adjacent LED boards.

FIG. 3 is an explanatory view showing the clearance 53b formed between the adjacent LED boards 5c and 5d. The clearance 53 (53b) defines a portion (space) that is sandwiched between end portions 54 of the wiring boards 52 of the LED boards 5 as shown in FIG. 3. It is unnecessary to positively provide the clearance 53 by disposing the LED boards 5 apart. In other embodiments, the end portions 54 of the LED boards 5 may be substantially in contact with each other. It is preferable surfaces 522 of the wiring boards 52 are subjected to a reflective treatment as described above.

Figure 8:
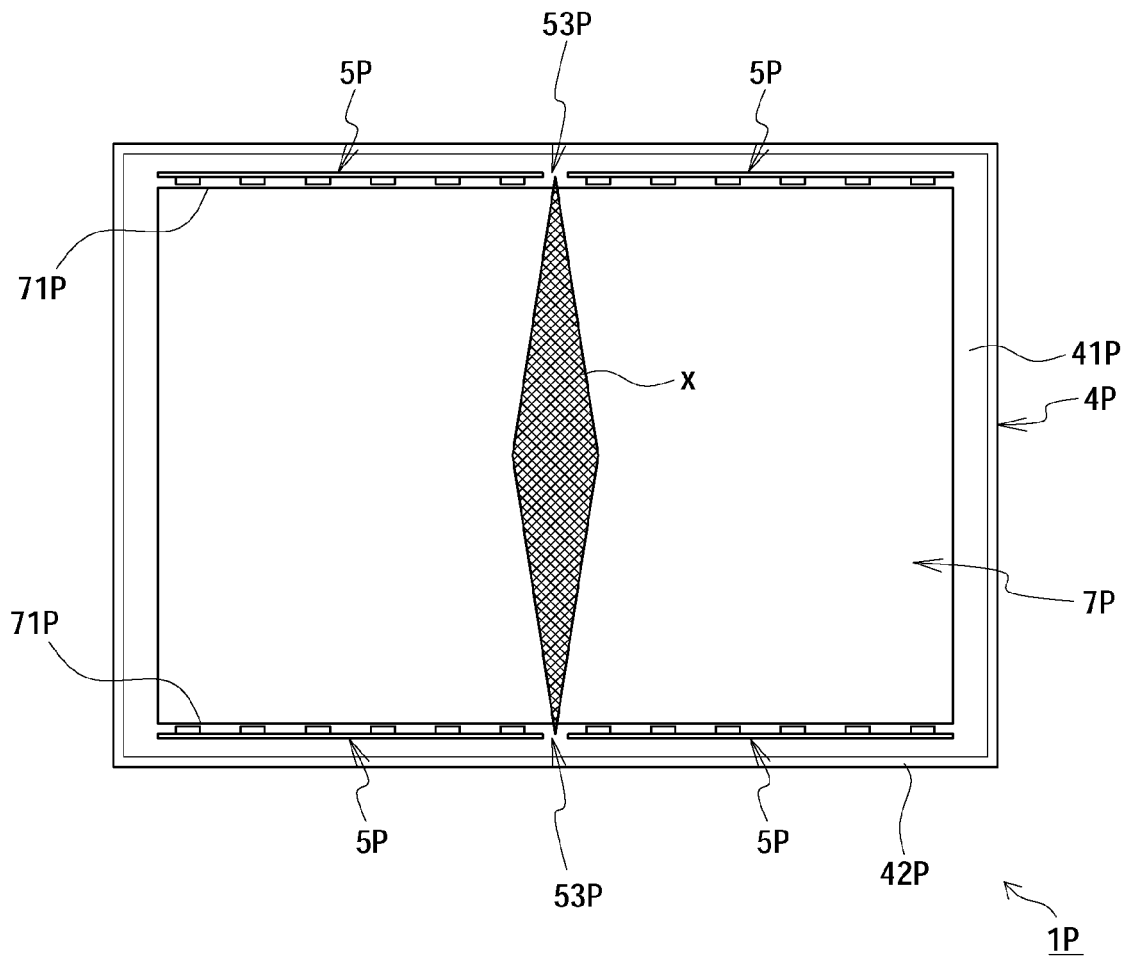
FIG. 8 is a plan view schematically showing luminance unevenness developing in the conventional illuminating device shown in FIG. 7.

Depending on the size (width) of the formed clearances 53, the amounts of light that enters from the end faces of the light guide plate 7 at the portions close to the clearances 53 could become less than the amounts of light that enters from the end faces of the light guide plate 7 at areas around the portions close to the clearances 53, and thus the portions close to the clearances 53 could form regions x that are darker than the areas around them. However, these dark regions x are usually much smaller than a dark region that is produced by the clearances 53 that face each other (see FIG. 8), and thus do not cause luminance unevenness in the illuminating device 1.

In the illuminating device 1 of the present embodiment, the clearances 53 formed between the LED boards 5 are made not to face each other while sandwiching the light guide plate therebetween, whereby a large dark region x so as to cross the light guide plate 7 shown in the conventional illuminating device 1P (see FIG. 8) can be at least prevented from forming.

Figure 4:
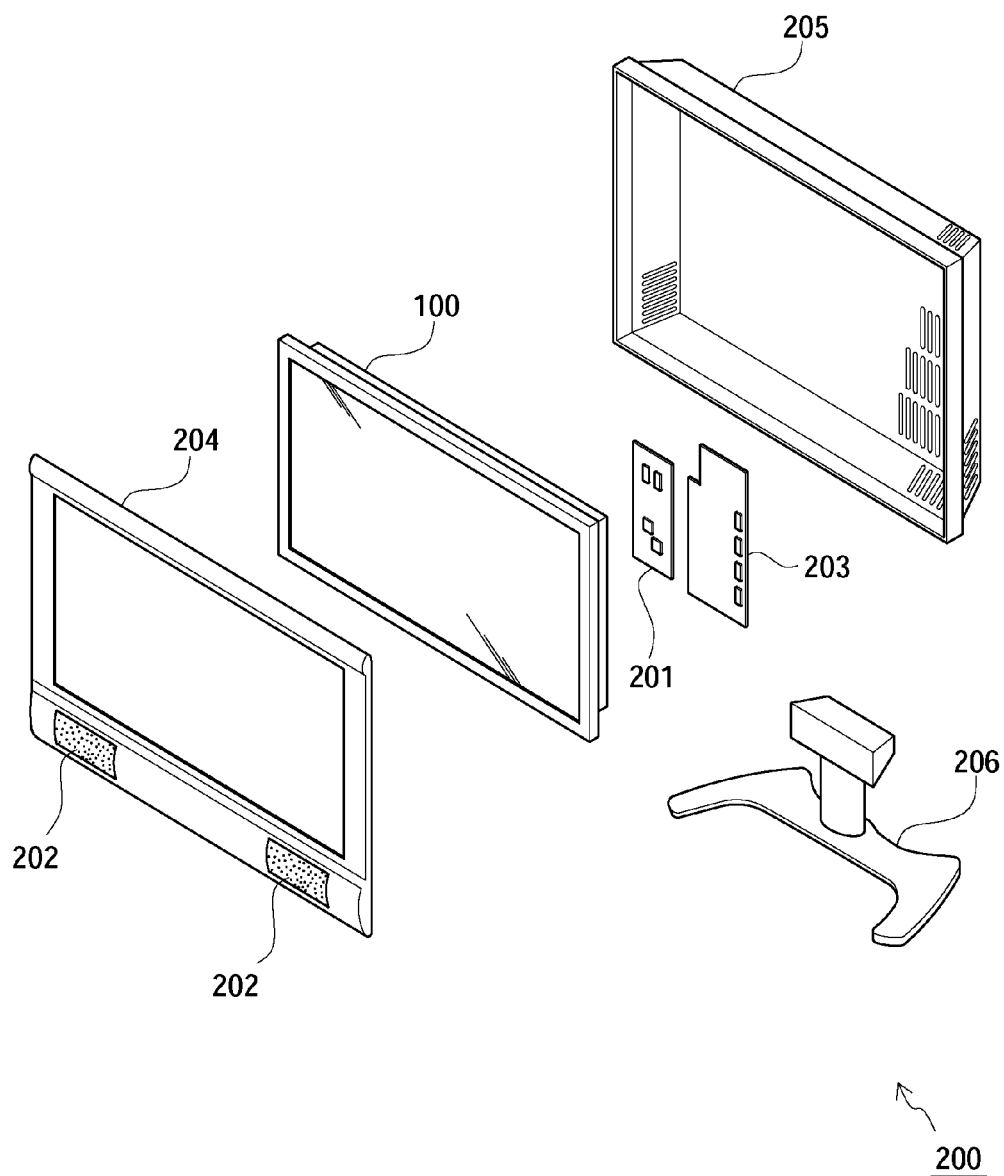
FIG. 4 is an exploded perspective view showing a schematic configuration of a television receiving device of a preferred embodiment of the present invention.

The liquid crystal display device 100 of the present embodiment is used preferably in a television receiving device. A description of a television receiving device of a preferred embodiment of the present invention will be provided with reference to FIG. 4. FIG. 4 is an exploded perspective view showing a schematic configuration of the television receiving device of the present embodiment. A television receiving device 200 includes the liquid crystal display device 100, a tuner 201, loudspeaker units 202, an electric power supply 203, a front side cabinet 204, a back side cabinet 205, and a supporting member 206. The television receiving device 200 includes the liquid crystal display device 100 including the illuminating device 1.

The tuner 201 is arranged to produce an image signal and a sound signal of a given channel based on a received radio wave. A conventional terrestrial tuner (analog and/or digital), a BS tuner and a CS tuner are preferably used as the tuner 201.

The loudspeaker units 202 are arranged to produce a sound based on the sound signal produced by the tuner 201. Generally-used speakers are preferably used as the loudspeaker units 202.

The electric power supply 203 is arranged to supply electric power to the liquid crystal display device 100, the tuner 201, the loudspeaker units 202 and other components.

The liquid crystal display device 100, the tuner 201, the loudspeaker units 202 and the electric power supply 203 are sandwiched between the front side cabinet 204 and the back side cabinet 205, and housed therein, which are supported by the supporting member (i.e., stand) 206.

Including the illuminating device 1, the television receiving device 200 of the present embodiment is capable of preventing luminance unevenness from developing therein.

Figure 5:
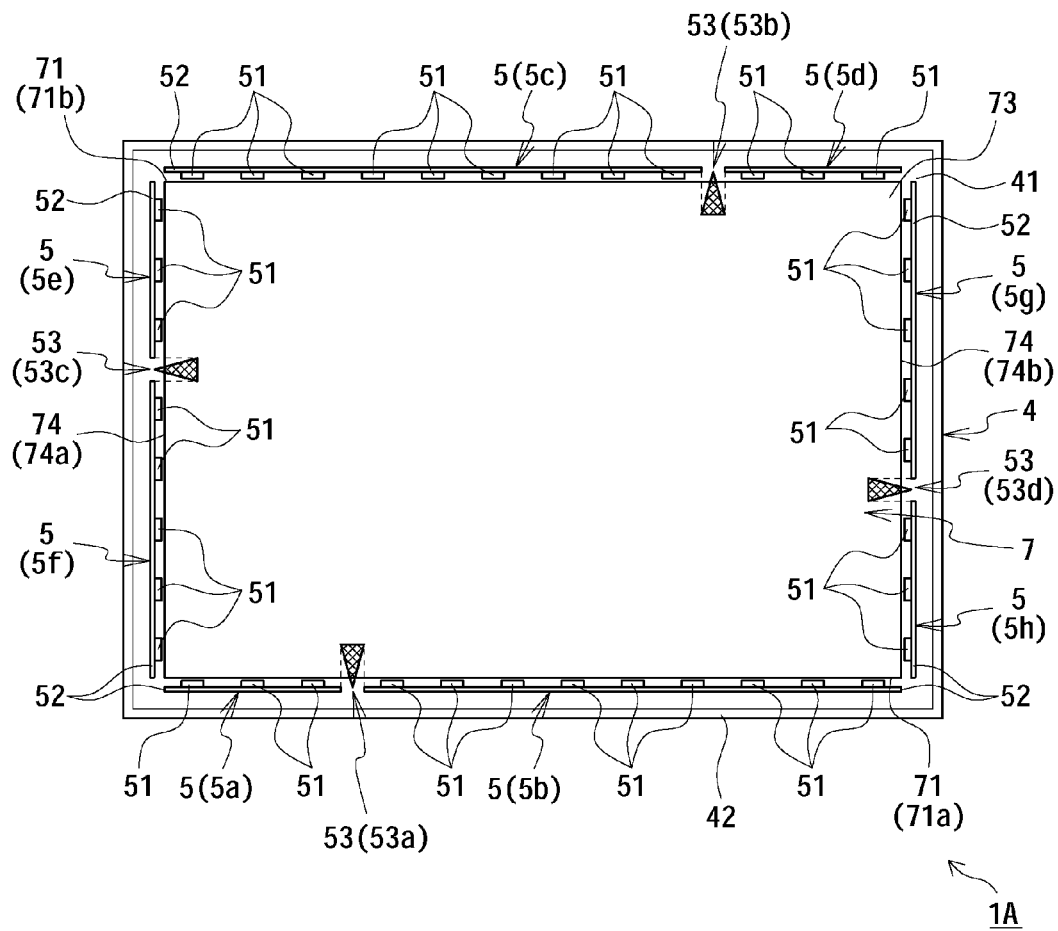
FIG. 5 is a plan view showing a schematic configuration of an illuminating device of another preferred embodiment of the present invention.

Hereinafter, a description of an illuminating device 1A of another preferred embodiment of the present invention will be provided with reference to FIG. 5. FIG. 5 is a plan view showing a schematic configuration of the illuminating device 1A of the present embodiment. In the illuminating device 1A, the LED boards 5 are aligned not only along the two end faces 71 (71a and 71b) on the long sides of the light guide plate 7, but also along end faces 74 (74a and 74b) on the short sides of the light guide plate 7.

As shown in FIG. 5, the LED boards 5e and 5f are aligned along the end face 74a on the one short side of the light guide plate 7. A clearance 53 (53c) exists between the LED boards 5e and 5f. Meanwhile, the LED boards 5g and 5h are aligned along the end face 74b on the other short side of the light guide plate 7. A clearance 53 (53d) exists between the LED boards 5g and 5h. The LEDs 51 on the LED boards 5 are disposed so as to face the end faces 74.

In the present embodiment, the LED boards 5e and 5h are of the same kind, and thus their wiring boards 52 are same in length and their LEDs 51 are same in number. The LED boards 5f and 5g are of the same kind, and thus their wiring boards 52 are same in length and their LEDs 51 are same in number. In the present embodiment, the LED board 5e (5h) is shorter than the LED board 5f (5g).

In the present embodiment, the short sides of the light guide plate 7 are longer than the total of the length of the LED board 5e and the length of the LED board 5f, so that the clearance 53 (53c) is formed between the LED boards 5e and 5f. In addition, for the same reason, the clearance 53 (53d) is formed between the LED boards 5g and 5h. In the present embodiment, the shorter LED board 5e (or 5h) is disposed on the left as it faces the end face 74 of the light guide plate 7 while the longer LED board 5f (or 5g) is disposed on the right as it faces the end face 74 of the light guide plate 7 as shown in FIG. 5. Disposing the LED boards 5 as described above makes the LED boards 5 different in length face each other while sandwiching the long sides of the light guide plate 7 therebetween. Consequently, the clearances 53 (53c and 53d) formed between the LED boards 5 do not face each other while sandwiching the light guide plate 7 therebetween.

Owing to the disposition of the LED boards 5 where the clearances 53 do not face each other even when the plurality of the LED boards 5 are disposed on each of the four sides of the light guide plate 7, uniform planar light can be easily emitted from the front face 73 of the light guide plate 7, which can prevent luminance unevenness from developing in the illuminating device 1.

Figure 6:
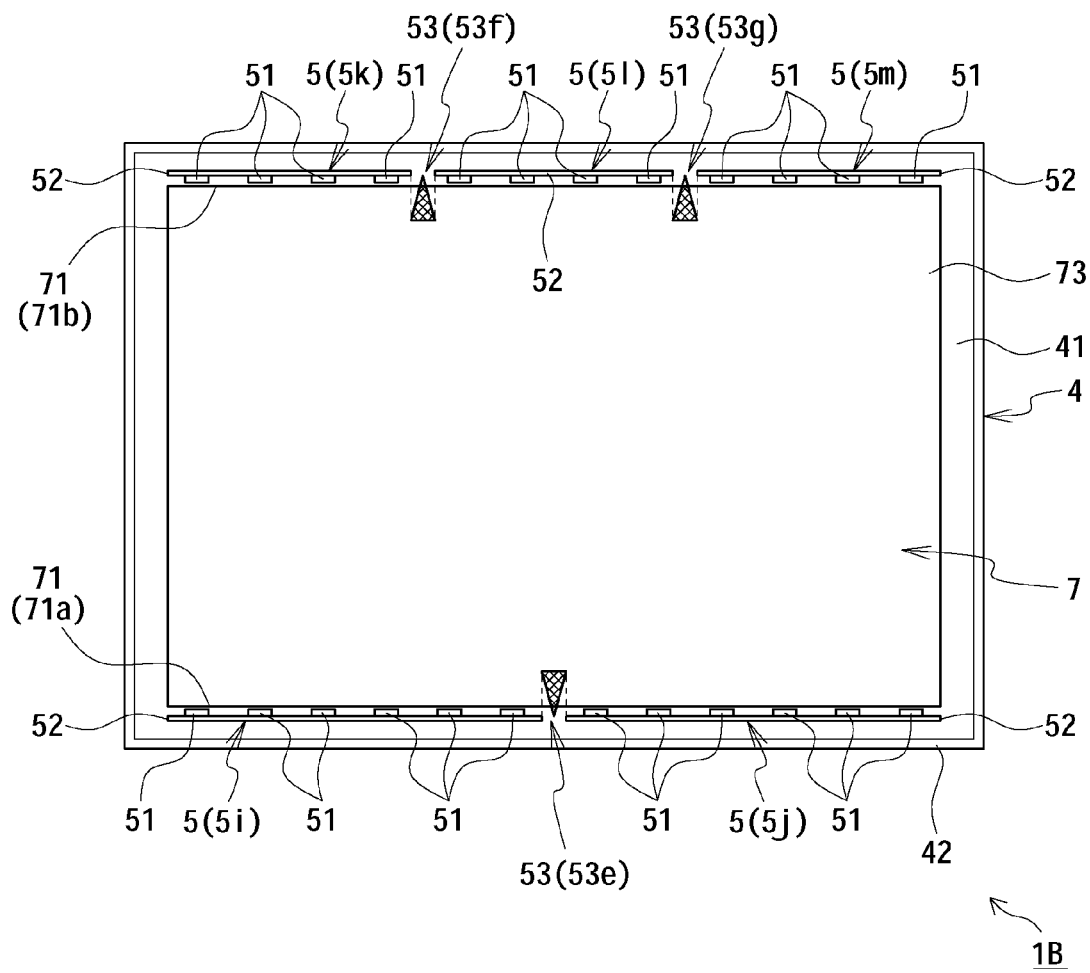
FIG. 6 is a plan view showing a schematic configuration of an illuminating device of another preferred embodiment of the present invention.
Figure 7:
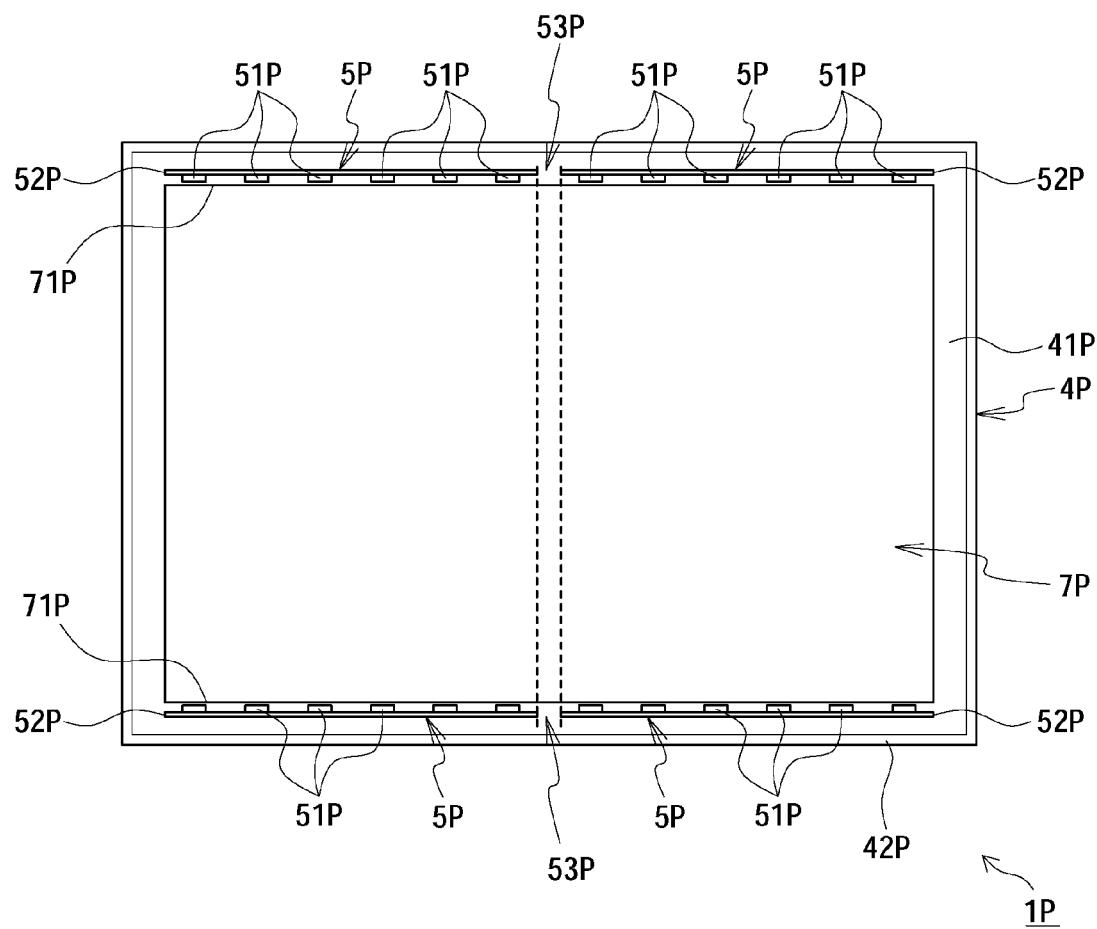
FIG. 7 is a plan view showing a schematic configuration of a conventional illuminating device.

Hereinafter, a description of an illuminating device 1B of another preferred embodiment of the present invention will be provided with reference to FIG. 6. FIG. 6 is a plan view showing a schematic configuration of the illuminating device 1B of the present embodiment. In the illuminating device 1B, similarly to the illuminating device 1 shown in FIG. 1, the LED boards 5 are aligned along both the end faces 71 (71a and 71b) on the two long sides of the light guide plate 7. However, in the illuminating device 1B, the LED boards 5 aligned along the end face 71a on one of the long sides of the light guide plate 7 are different in number from the LED boards 5 aligned along the end face 71b on the other long side of the light guide plate 7.

As shown in FIG. 6, two LED boards 5i and 5j are aligned along the end face 71a on the one long side of the light guide plate 7. One clearance 53 (53e) exists between the LED boards 5i and 5j. Meanwhile, three LED boards 5k, 5l and 5m are aligned along the end face 71b on the other long side of the light guide plate 7. Two clearances 53 (53f and 53g) exist between the LED boards 5k, 5l and 5m. The LEDs 51 on the LED boards 5 are disposed so as to face the end faces 74 similarly to the other embodiments.

In the present embodiment, the LED boards 5i and 5j are of the same kind, and thus their wiring boards 52 are same in length and their LEDs 51 are same in number. The LED boards 5k, 5l and 5m are of the same kind, and thus their wiring boards 52 are same in length and their LEDs 51 are same in number. In the present embodiment, the LED board 5k (5l, 5m) is shorter than the LED board 5i (5j).

In the present embodiment, the long side of the light guide plate 7 is longer than the total of the length of the LED board 5i and the length of the LED board 5j. Thus, when the end positions of the LED board 5i and 5j are aligned at both the ends of the one long side of the light guide plate 7, the one clearance 53 (53e) is formed in the middle of the one long side between the LED boards 5i and 5j. In addition, the long side of the light guide plate 7 is longer than the total of the length of the LED board 5k, the length of the LED board 5l and the length of the LED board 5m. Thus, when the LED boards 5k, 5l and 5m are disposed at regular intervals along the end face 71b on the other long side of the light guide plate 7, the two clearances 53 (53f and 53g) are formed at such positions as to trisect the long side of the light guide plate 7. Disposing the LED boards 5 along the two end faces 71 (71a and 71b) of the light guide plate 7 as described above makes the one clearance 53 (53e) on the end face 71a on the one long side not to face the two clearances 53 (53f and 53g) on the end face 71b on the other long side while sandwiching the light guide plate 7 therebetween.

Thus, it is preferable that the clearances 53 are made not to face each other by determining as appropriate the lengths and the numbers of the LED boards 5 along the end faces of the light guide plate 7. Also in the illuminating device 1B of the present embodiment, uniform planar light can be easily emitted from the front face 73 of the light guide plate 7, which can prevent luminance unevenness from developing therein.

In another preferred embodiment of the present invention, it is preferable that clearances are made not to face each other by a configuration such that light-emitting boards (LED boards) along one end face of a light guide plate are different in number from light-emitting boards along another end face of the light guide plate, the light-emitting boards along the one end face and the light-emitting boards along the another end face facing each other while sandwiching the light guide plate therebetween.

In another preferred embodiment of the present invention, it is preferable that light-emitting boards (LED boards) along one end face of a light guide plate are different in emission intensity from light-emitting boards (LED boards) along another end face of the light guide plate, the light-emitting boards along the one end face and the light-emitting boards along the another end face facing each other while sandwiching the light guide plate therebetween. It is also preferable that light-emitting elements (LEDs) on light-emitting boards along one end face of a light guide plate are different in emission intensity from light-emitting elements (LEDs) on light-emitting boards along another end face of the light guide plate, the light-emitting boards along the one end face and the light-emitting boards along the another end face facing each other while sandwiching the light guide plate therebetween.

In another preferred embodiment of the present invention, it is preferable that light-emitting elements (LEDs) are aligned on a light-emitting board at intervals different from intervals at which light-emitting elements (LEDs) are aligned on another light-emitting board. It is also preferable that light-emitting elements (LEDs) on each light-emitting board along one end face of the light guide plate are aligned at intervals different from intervals at which light-emitting elements (LEDs) on each light-emitting board along another end face of the light guide plate are aligned, the light-emitting boards along the one end face and the light-emitting boards along the another end face facing each other while sandwiching the light guide plate therebetween.

In another preferred embodiment of the present invention, it is preferable that light-emitting elements (LEDs) on a light-emitting board are different in number from light-emitting elements (LEDs) on another light-emitting board. It is also preferable that light-emitting elements (LEDs) on each light-emitting board along one end face of a light guide plate are different in number from light-emitting elements (LEDs) on each light-emitting board along another end face of the light guide plate, the light-emitting boards along the one lateral end face and the light-emitting boards along the another lateral end face facing each other while sandwiching the light guide plate therebetween.

In another preferred embodiment of the present invention, it is preferable that light-emitting elements (LEDs) on a light-emitting board have an emission peak wavelength different from an emission peak wavelength of light-emitting elements (LEDs) on another light-emitting board. It is also preferable that light-emitting elements (LEDs) on light-emitting boards along one end face of a light guide plate have an emission peak wavelength different from an emission peak wavelength of light-emitting elements (LEDs) on light-emitting boards along another end face of the light guide plate, the light-emitting boards along the one lateral end face and the light-emitting boards along the another lateral end face facing each other while sandwiching the light guide plate therebetween.

In another preferred embodiment of the present invention, it is preferable that light-emitting elements (LEDs) on a light-emitting board have a structure different from a structure of light-emitting elements (LEDs) mounted on another light-emitting board. It is also preferable that light-emitting elements (LEDs) on light-emitting boards along one end face of a light guide plate have a structure different from a structure of light-emitting elements (LEDs) on light-emitting boards along another end face of the light guide plate, the light-emitting boards along the one lateral end face and the light-emitting boards along the another lateral end face facing each other while sandwiching the light guide plate therebetween.

In another preferred embodiment of the present invention, it is preferable that light-emitting elements (LEDs) on a light-emitting board have directional optical properties different from directional optical properties of light-emitting elements (LEDs) on another light-emitting board. It is also preferable that light-emitting elements (LEDs) on light-emitting boards along one end face of a light guide plate have directional optical properties different from directional optical properties of light-emitting elements (LEDs) on light-emitting boards along another end face of the light guide plate, the light-emitting boards along the one lateral end face and the light-emitting boards along the another lateral end face facing each other while sandwiching the light guide plate therebetween.

In another preferred embodiment of the present invention, it is preferable that at least one of LEDs defines a blue light-emitting chip that is coated with a fluorescent material that has an emission peak wavelength in a yellow region, and the at least one of the LEDs is arranged to emit white light.

In another preferred embodiment of the present invention, it is preferable that a sealing section for sealing a fluorescent material of each LED has a dome structure. In another preferred embodiment of the present invention, it is preferable that a sealing section for sealing a fluorescent material of each LED has a crater structure. To be specific, it is preferable that the section of each LED arranged to seal a blue light-emitting chip, which is coated with the fluorescent material, so as to coat with a resin (i.e., the sealing section) has a dome structure (a hemispheric structure protruding outward), or a crater structure (a hemispheric structure hollowing inward). It is preferable to use these structures to adjust the directional optical properties of the LEDs.

In another preferred embodiment of the present invention, it is preferable that the mounted chip of each LED has a flip-chip structure. To be specific, it is preferable that electrodes of each LED chip are directly bonded to wiring patterns formed on wiring boards.

In another preferred embodiment of the present invention, it is preferable that the mounted chip of each LED has a wire bonding structure. To be specific, it is preferable that electrodes of each LED chip are electrically connected to wiring patterns formed on wiring boards by Au wires.

Usually, light-emitting boards such as LED boards include power supply connectors. The power supply connectors are disposed at end portions of long wiring boards in the light-emitting boards. Outer portions of the power supply connectors are usually made from a non-emissive material such as plastic. In another preferred embodiment of the present invention, it is preferable that the power supply connector on one LED board is disposed at a position different from a position at which the power supply connector on another LED board is disposed. In another preferred embodiment of the present invention, it is also preferable that the power supply connectors on the LED boards along one end face of a light guide plate are disposed at positions different from positions at which the power supply connectors on the LED boards along another end face of the light guide plate are disposed, the light-emitting boards along the one lateral end face and the light-emitting boards along the another lateral end face facing each other while sandwiching the light guide plate therebetween.

The invention claimed is:

1. An illuminating device comprising:
a plurality of light-emitting boards, each of which comprises:
a long wiring board;
a plurality of light-emitting elements mounted on the wiring board; and
clearances between the adjacent light-emitting boards; and
a light guide plate having a rectangular shape, and arranged to guide light that enters from its end faces inward and emit the light from its front face,
wherein the plurality of light-emitting boards are aligned along each of the end faces of the light guide plate, the end faces being opposed to each other, while the clearances between the adjacent light-emitting boards on the opposed end faces are prevented from facing each other while sandwiching the light guide plate therebetween.

2. The illuminating device according to claim 1, wherein surfaces of the light-emitting boards are subjected to a reflective treatment.

3. The illuminating device according to claim 1, wherein the light-emitting elements comprise light emitting diodes.

4. The illuminating device according to claim 3,
wherein the light emitting diodes mounted on each of the light-emitting boards along the one lateral end face of the light guide plate are different in number from the light emitting diodes mounted on each of the light-emitting boards along the another lateral end face.

5. The illuminating device according to claim 3,
wherein the light emitting diodes mounted on the light-emitting boards along the one lateral end face of the light guide plate have an emission peak wavelength different from an emission peak wavelength of the light emitting diodes mounted on the light-emitting boards along the another lateral end face.

6. The illuminating device according to claim 3,
wherein the light emitting diodes mounted on the light-emitting boards along the one lateral end face of the light guide plate have directional optical properties different from directional optical properties of the light emitting diodes mounted on the light-emitting boards along the another lateral end face.

7. An illuminating device comprising:
a plurality of light-emitting boards that are disposed while facing a light entrance face of one lateral end face of a light guide plate that has a rectangular shape and is disposed on an inner bottom face of a chassis; and
a plurality of light-emitting boards that are disposed while facing a light entrance face of another lateral end face of the light guide plate that is opposed to the one lateral end face,
wherein the light-emitting boards that face the opposed lateral end faces are disposed while a clearance region between the light-emitting boards facing the light entrance face of the one lateral end face and a clearance region between the light-emitting boards facing the light entrance face of the another lateral end face are prevented from facing each other.

8. The illuminating device according to claim 7,
wherein the light-emitting boards along the one lateral end face of the light guide plate have a length that is different from a length of the light-emitting boards along the another lateral end face.

9. The illuminating device according to claim 7,
wherein the light-emitting boards along the one lateral end face of the light guide plate are different in number from the light-emitting boards along the another lateral end face, the light-emitting boards along the one lateral end face and the light-emitting boards along the another lateral end face facing each other while sandwiching the light guide plate therebetween.

10. The illuminating device according to claim 7,
wherein the light-emitting boards along the one lateral end face of the light guide plate are different in emission intensity from the light-emitting boards along the another lateral end face, the light-emitting boards along the one lateral end face and the light-emitting boards along the another lateral end face facing each other while sandwiching the light guide plate therebetween.

11. An illuminating device comprising:
a plurality of light-emitting boards, each of which comprises:
a long wiring board;
a plurality of light-emitting elements mounted on the wiring board; and
clearances between the adjacent light-emitting boards; and
a light guide plate having a rectangular shape, and arranged to guide light that enters from its end faces inward and emit the light from its front face; wherein
the plurality of light-emitting boards are aligned along each of the end faces of the light guide plate, the end faces being opposed to each other, while the clearances between the adjacent light-emitting boards on the opposed end faces are prevented from facing each other while sandwiching the light guide plate therebetween; and
surfaces of the light-emitting boards are subjected to a reflective treatment.

12. An illuminating device comprising:
a plurality of light-emitting boards, each of which comprises:
a long wiring board;
a plurality of light-emitting elements mounted on the wiring board; and
clearances between the adjacent light-emitting boards; and
a light guide plate having a rectangular shape, and arranged to guide light that enters from its end faces inward and emit the light from its front face; wherein
the plurality of light-emitting boards are aligned along each of the end faces of the light guide plate, the end faces being opposed to each other, while the clearances between the adjacent light-emitting boards on the opposed end faces are prevented from facing each other while sandwiching the light guide plate therebetween;
the light-emitting elements comprise light emitting diodes; and
the light emitting diodes mounted on the light-emitting boards along the one lateral end face of the light guide plate have directional optical properties different from directional optical properties of the light emitting diodes mounted on the light-emitting boards along the another lateral end face.

13. A liquid crystal display device comprising:
the illuminating device according to claim 1; and
a transmissive or transflective liquid crystal display panel,
wherein the illuminating device is disposed on a back-face side of the liquid crystal display panel, and planar light emitted from the illuminating device is projected onto the back-face side of the liquid crystal display panel.

14. A television receiving device that comprises the liquid crystal display device according to claim 13.

* * * * *